Oct. 17, 1967  J. D. FROST  3,347,587
ARTICLE HANDLING APPARATUS
Filed July 23, 1962  3 Sheets-Sheet 1

INVENTOR.
JAMES D. FROST
BY
Huebner & Worrel
ATTORNEYS.

Oct. 17, 1967  J. D. FROST  3,347,587
ARTICLE HANDLING APPARATUS
Filed July 23, 1962  3 Sheets-Sheet 2
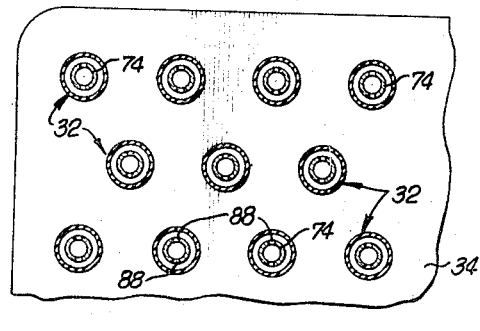
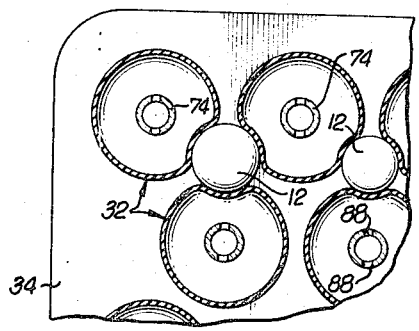
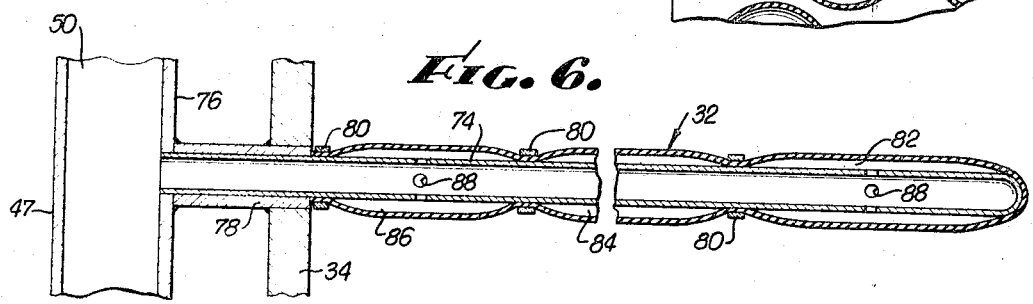
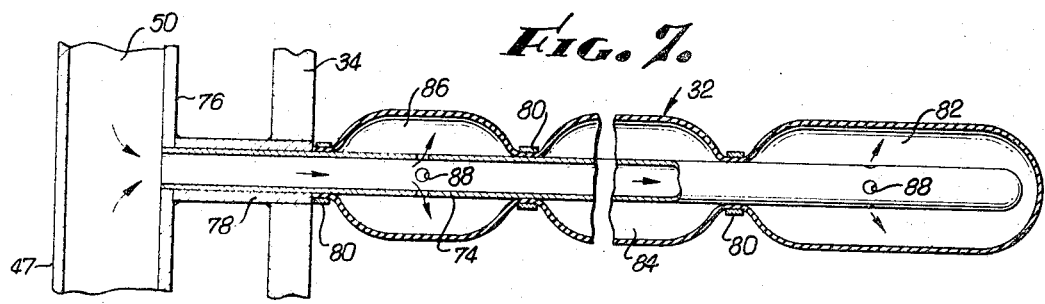
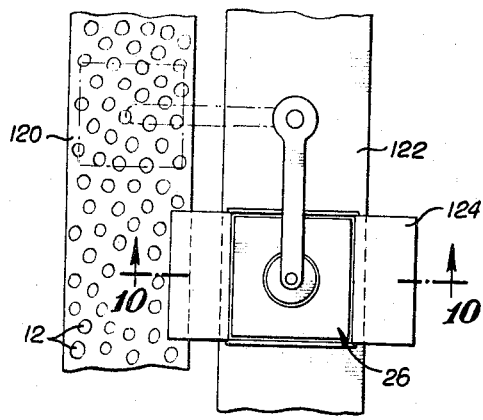
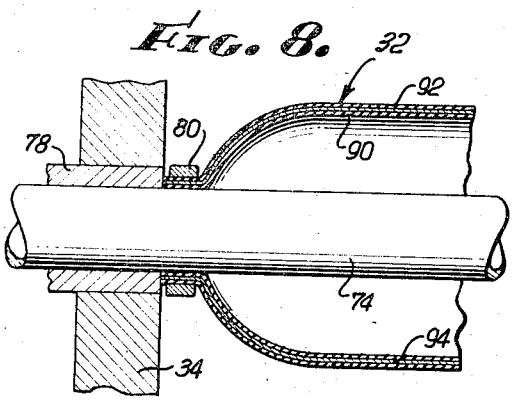
INVENTOR.
JAMES D. FROST
BY
Huebner & Worrel
ATTORNEYS.

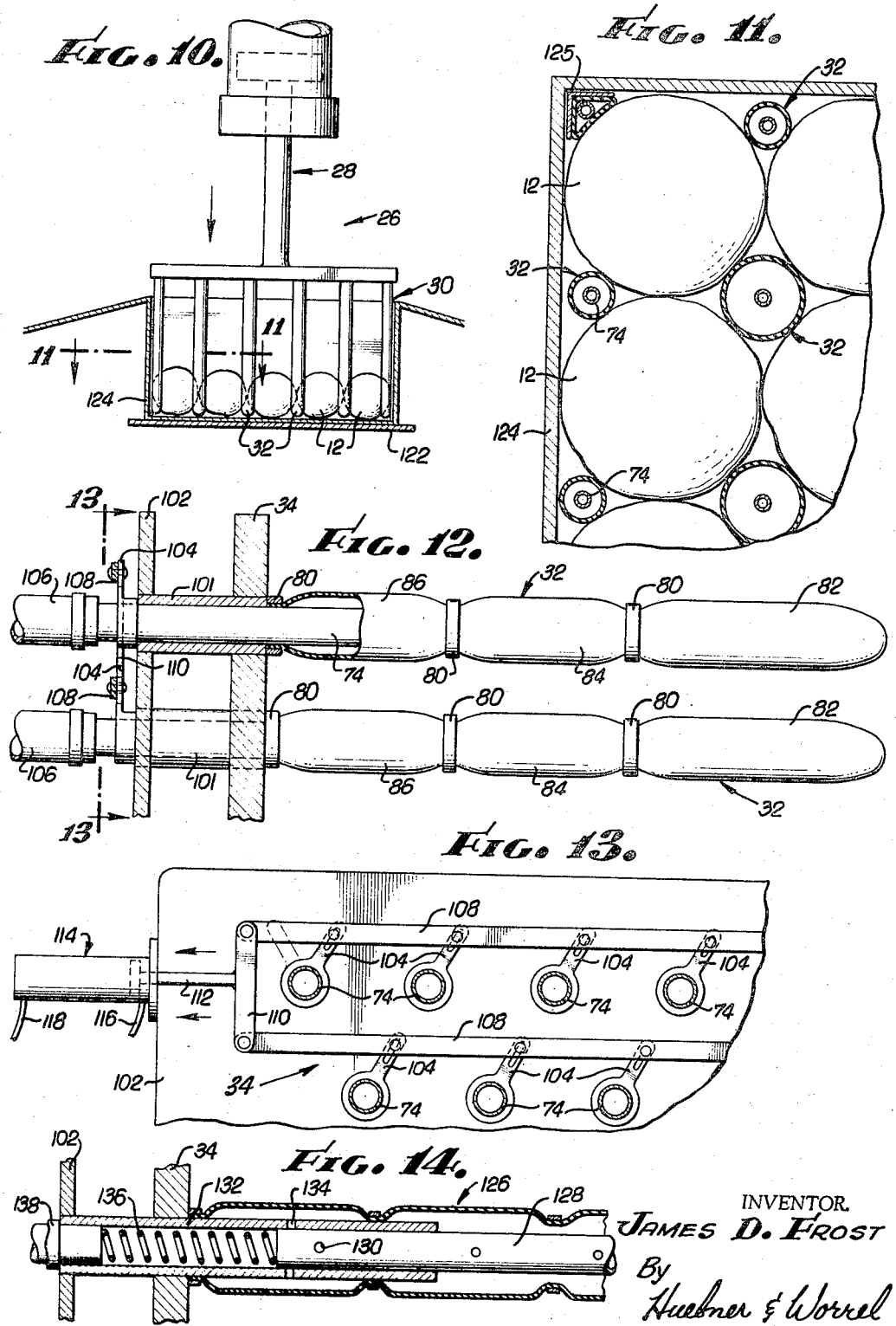

United States Patent Office 3,347,587
Patented Oct. 17, 1967

3,347,587
ARTICLE HANDLING APPARATUS
James Dahle Frost, P.O. Box 775,
Porterville, Calif. 93257
Filed July 23, 1962, Ser. No. 211,682
20 Claims. (Cl. 294—87)

This invention relates to apparatus for handling foods and more particularly it relates to apparatus employed for transferring fruit from one location to another such as picking fruit from trees, and transferring fruit from one conveyor to another and depositing the fruit within containers, cartons, crates, or boxes and the like, the fruit handling apparatus embodying a plurality of inflatable fingers which grasp or seize the fruit with a sufficiently great enough force to achieve the transferring, yet the grasping force is not so great as to bruise or otherwise damage the fruit to render the same unsightly or inedible.

It is an object of this invention to provide apparatus for handling fruit which may be employed for transfering fruit from one location to another such as picking fruit from trees, lifting fruit from one conveyor and transferring it to another where cartons and the like are provided to receive the fruit, there being a plurality of inflatable fingers which when inflated seize the fruit, the seizing of the fruit being such as to not in any way damage the fruit to render it unsightly or inedible.

Another object of this invention is to provide fruit handling apparatus of the aforementioned character wherein the inflatable fingers are arranged in a relatively dense grouping so that a relatively large number of fingers are available to seize the fruit on the trees and conveyors.

A yet further object of this invention is to provide fruit handling apparatus of the aforementioned character wherein the inflatable fingers may be rotated when picking fruit from trees so as to impart a twist to the fruit to separate the fruit from the associated stems.

A more specific object of this invention is to provide fruit handling apparatus of the aforementioned character wherein the inflatable fingers are fabricated of laminated flexible materials, one of the laminations being a fabric which functions as a stop to limit the inflation of the fingers.

Another specific object of this invention is to provide fruit handling apparatus of the character described wherein operation of the inflatable fingers is automatically and pneumatically controlled so as to extend the fingers into engagement with the fruit, inflate the fingers so as to effect frictional and compressive engagement with the fruit to either pick the fruit from the trees or lift the fruit from the conveyor, retract the fingers and deflate the fingers to release the fruit.

Another specific object of this invention is to provide fruit handling apparatus of the character described wherein the apparatus is mounted upon a mobile elevatable boom which is controlled by an operator so as to pick the fruit from remote areas of trees.

Another object of this invention is to provide a process for transferring fruit from one location to another wherein inflatable fingers are sequentially extended and inflated to seize the fruit after which the fingers are retracted and deflated to release the fruit.

Further objects and advantages of the invention will appear during the course of the following part of this specification wherein the details of construction and mode of operation of preferred embodiments is described with reference to the accompanying drawings, in which:

FIG. 4 is a fragmentary, sectional view, illustrating inflatable fingers of the present invention in the deflated condition.

FIG. 5 is a view similar to FIG. 4, but showing inflatable fingers in the inflated condition, seizing or engaging fruit.

FIG. 6 is a longitudinal sectional view illustrating a finger of the present invention in the deflated condition.

FIG. 7 is a view similar to FIG. 6, but illustrating a finger of the present invention in the inflated condition.

FIG. 8 is an enlarged sectional view illustrating the manner of construction of the inflatable fingers.

FIG. 9 is a fragmentary overhead plan view illustrating the fruit handling apparatus of the present invention as employed in a fruit packing house wherein it is used to transfer fruit from a fruit handling conveyor to a conveyor having packing cartons thereon.

FIG. 10 is a horizontal sectional view taken on line 10—10 of FIG. 9 and illustrating the manner of depositing the fruit within a carton, box or the like.

FIG. 11 is a horizontal sectional view, enlarged, taken on line 11—11 of FIG. 10, and illustrating the relationship of inflated fingers and fruit being handled therewith.

FIG. 12 is a side elevational view, showing inflatable fingers and the manner of causing the fingers to pivot or partially rotate.

FIG. 13 is a vertical sectional view taken on line 13—13 of FIG. 12.

FIG. 14 is a fragmentary, sectional view illustrating a second form of inflatable finger which may be employed in a group or clusters.

Figure 1:
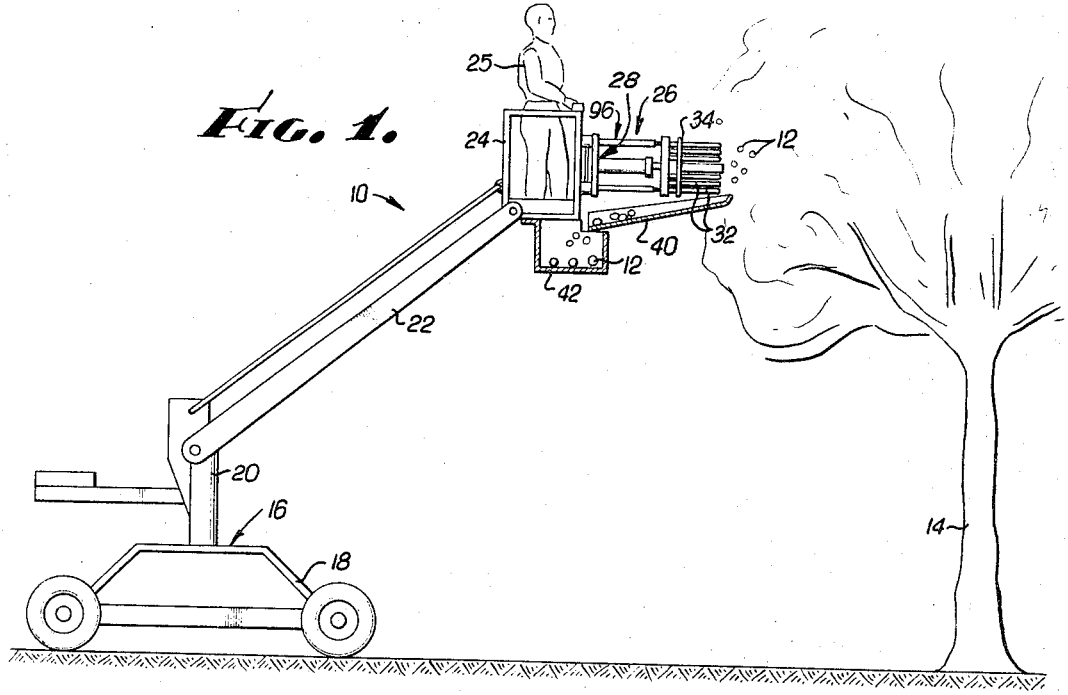
FIG. 1 is a generally schematic illustration, partly in section, showing fruit handling apparatus employed for picking fruit from trees.
Figure 2:
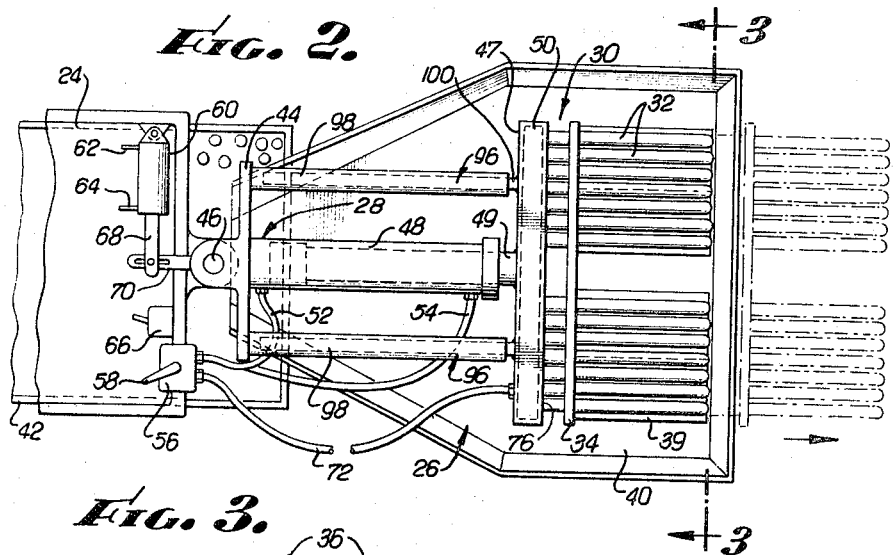
FIG. 2 is a fragmentary, plan view illustrating the mechanism for operating a plurality of extendable, retractable and inflatable fingers.

Referring, initially, to the form of the invention illustrated in FIG. 1, there is to be seen fruit handling apparatus 10 which is employed for picking fruit 12 from trees 14, a single tree being shown in FIG. 1. Fruit handling apparatus 10 is applicable for picking olives, oranges, apples and the like, all of which will hereinafter be simply identified as "fruit." Included in the fruit handling apparatus is a vehicle 16 which may be towed from one tree to another, or the vehicle may be self-propelled.

Vehicle 16 includes a wheel-supported chassis 18 having mounted thereon a rotatable vertical shaft 20, and mounted on the upper end of shaft 20 is an elevatable boom 22. Supported on the upper end of boom 22 is an operator's platform 24 which adequately accommodates an operator 25. FIG. 1 is somewhat schematic in regard to structural details relating to the mounting of the boom 22 and means to effect elevation thereof, such mounting and means being well-known to those skilled in the art of mechanisms requiring selectively elevated booms mounted for angular movement about a horizontally disposed axis.

Mounted on platform 24 and extending horizontally therefrom is a finger assembly 26 which includes a pneumatic unit 28, and a horizontally extendable and retractable finger unit 30, the finger unit being actuated by pneumatic unit 28 and embodying a plurality of horizontally and forwardly extending inflatable fingers 32. It is to be understood that unit 28 may also be hydraulically operated.

Figure 3:
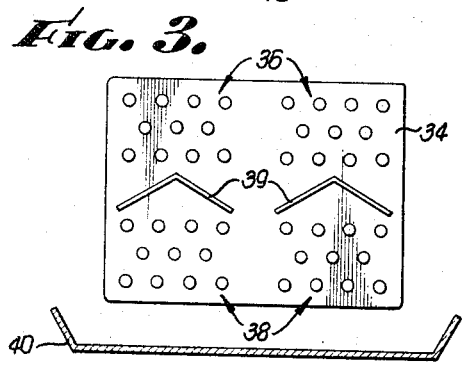
FIG. 3 is a vertical sectional view, partially in elevation, taken on line 3—3 of FIG. 2.

Fingers 32 are relatively densely and rigidly mounted on a finger base plate 34, a component of finger unit 30, and arranged in groups, there being a pair of horizontally spaced upper groups 36 partitioned from a pair of horizontally spaced lower groups 38 by a pair of horizontally spaced inverted V-shaped baffles or deflectors 39 which are mounted on finger base plate 34 and extend forwardly therefrom, see FIG. 3.

When pneumatic unit 28 is actuated by operator 25 to extend finger unit 30, the target fruit 12 becames positioned between a plurality of deflated fingers 32. Fingers 32 are then inflated to gently frictionally and compressively seize the fruit without imparting a bruise thereto which may lead to spoilage. Either automatically or by operator control, finger unit 30 is retracted to remove the fruit from its stem and fingers 32 are deflated to release the fruit. The fruit released from the upper group of fingers 36 fall onto deflectors 39 which deflect the fruit away from the lower groups of fingers 38. The deflected fruit as well as the fruit released from the lower groups of fingers 38 fall into an inclined chute or trough 40 and roll toward a container 42 which is disposed under the operator's platform 24.

Pneumatic unit 28 comprises a support base plate 44 which is hingedly mounted on operator's platform 24 so finger assembly 26 may be pivoted horizontally about a vertical shaft 46. Extending forwardly from base plate 44 and mounted thereon is a pneumatic cylinder 48 having a piston 49 therein, the terminal end thereof being fastened to the rear face 47 of a manifold 50 which is a component of finger unit 30. Leading from the rear end and from the forward end of cylinder 48 are flexible air conduits 52 and 54, respectively, which are connected to a manually actuated pneumatic control valve 56 mounted on operator's platform 24 within easy access to operator 25.

Turning handle 58 of control valve 56 one way results in delivering air to the rear end of cylinder 48 and extending finger unit 30, and turning handle 58 in the opposite direction causes air to be delivered to the forward end of cylinder 48 and retracting finger unit 30. However, control valve 56 may be semi-automatic; i.e., turning handle 58 in one direction will result in extending and retracting finger unit 30 and performing all other operations with respect to inflating and deflating fingers 32, hereinafter described in greater detail. The source of air for control valve 56 may be an air compressor (not shown) which is disposed on chassis 18.

Horizontal pivoting of finger assembly 26 is achieved by a pneumatic piston and cylinder assembly 60, which is located in operator's platform 24, and which has flexible air conduits 62 and 64 leading therefrom to a manually-actuated control valve 66 which receives its supply of air from the same source as cylinder 48. Control valve 66 is also located in operator's platform 24. Connection between piston and cylinder assembly 60 and finger assembly 26 is achieved through a piston rod 68 which is connected to a rigid link 70 extending rearwardly from support base plate 44, the connection being what is commonly referred to as a "lost motion" connection.

The aforementioned control valve 56 is connected to manifold 50 by a flexible conduit 72 so that when air is delivered to both the forward and rear ends of cylinder 48, air is delivered to and discharged from manifold 50. Thus flexible conduit 72 functions to deliver air to manifold 50 and to carry air from the manifold when finger unit 30 is extended and retracted respectively.

Air delivered to manifold 50 is distributed to a plurality of elongated forwardly-extending tubes 74, there being a tube 74 for each inflatable finger 32, see, pariticularly, FIGS. 6 and 7. The open rear end of each tube 74 is rigidly mounted in the forward face 76 of manifold 50, the forward end of each tube being closed. Each tube 74 is supported by a bushing 78 which is inserted into an opening in the aforementioned base plate 34 provided therefor, bushing 78 also functioning as a spacer to maintain manifold 50 in spaced relationship to finger base plate 34. Bushings 78 are welded or otherwise affixed to the forward face 76 of manifold 50 and finger base plate 34.

Each of the inflatable fingers 32 is fabricated of laminated flexible material, and each finger is firmly fastened to a corresponding tube 74 by a plurality of spaced collars or bands 80, one of which is about the open neck of the finger to prevent air leakage. Collars 80 of each finger, partition the finger into a forward section 82, an intermediate section 84 and a rear section 86. Inflation of each section of each finger is achieved by air being discharged from corresponding tube 74 through ports 88, there being ports in the tube which communicate with each section of the finger.

The laminated flexible material of fingers 32 comprises an inner and outer layer 90 and 92, respectively, of sheet elastomer material which is preferably rubber, see FIG. 8. It is the rubber which enables the fingers to achieve a frictional engagement with fruit 12. Between inner and outer layers 90 and 92 is a sheet of fabric 94 to which the inner and outer layers are bonded. Fabric 94 has a limited elastic modulus, and therefore contributes to restricting the amount of inflation which can be imparted to fingers 32. Air delivered to fingers 32 is also carefully controlled by valve 56 which also contributes to restricting the inflation of the fingers.

Finger unit 30 is accurately guided through the horizontal extendable and retractable path of travel by guides 96 which comprise an elongated tube 98 there being a tube mounted on each corner of support base plate 44 and extending forwardly therefrom. Each tube 98 receives therein a rod plunger 100 which is connected to the rear face 47 of manifold 50.

Instead of rigidly mounting fingers 32 in manifold 50, fingers 32 may be rotatably mounted in the manner illustrated in FIGS. 12 and 13. Each tube 74 may be freely pivoted in and supported by a corresponding bushing 101, the bushing being mounted in finger base plate 34 and a second base plate 102 held in rearward spaced relationship to base plate 34 by bushings 101. Firmly fastened adjacent the rear end of each tube 74 is a lever 104, and connecting the rear end of each tube with a source of air is a flexible conduit 106. The source of air may be that delivered from a control valve similar to control valve 56.

Each of the horizontally aligned levers 104 are connected by a lost motion connection to a single horizontal link 108, and each of the links 108 are connected to a vertical piston bar 110 which is fastened to the terminal end of a piston rod 112. Piston rod 112 is a component of a pneumatic cylinder and piston assembly 114. Air is delivered to and discharged from assembly 114 by flexible conduits 116 and 118, the source of air may be the same as that for pneumatic cylinder and piston assembly 60.

When air is delivered to assembly 114 to cause piston rod 112 to move in the direction of the arrows, each tube 74 and inflatable finger 32 pivots or partially rotates anticlockwise as viewed in FIG. 13, and actuation of piston rod 112 in the opposite direction pivots or partially rotates tubes 74 and fingers 32 in a clockwise direction. This pivoting of inflatable fingers 32 imparts a twist to the fruit to separate the fruit from the stem when the fingers are inflated and in frictional engagement therewith.

A second form of inflatable finger 126 is shown in FIG. 14 which may be optionally substituted for fingers 32 when the latter are employed for picking fruit from trees.

When finger unit 30 is extended into trees to pick the target fruit, there is a possibility that certain of the fingers will strike a branch with sufficiently great enough force to damage the fingers. To prevent such a result from occurring, inflatable finger 126 is telescopable so that the length thereof may be reduced as much as about 50% on striking a branch.

Finger 126 is illustrated as being mounted on finger base plate 34 and second base plate 102, but it is to be understood that inflatable finger 126 may also be mounted on finger base plate 34 and employed with manifold 50.

Referring, now, to FIG. 14, there is to be seen a spring loaded tube 128 having ports 130 therein. Tube 128 is telescopably disposed within and supported by a bushing 132 which is mounted in base plate 102 and finger base plate 34 and which extends forwardly from finger base plate 34. Bushing 132 is also provided with ports 134.

Disposed within bushing 132 is a compression spring 136, one end of which seats against tube 128, the other end seating against flexible air supply conduit 138 which is connected to bushing 132.

Thus it may be seen that if inflatable finger 126 strikes a tree branch, tube 128 will retract in bushing 132 and damage to finger 126 will be prevented.

Finger assembly 26 is applicable for use in a fruit packing house where it may be pivotally mounted over a fruit conveyor 120 and a carton conveyor 122 and employed to pack fruit cartons, crates, boxes or the like 124, see FIGS. 9, 10 and 11. A pneumatic piston and cylinder assembly similar to assembly 60 may be employed to horizontally pivot finger assembly 26 to and from the dotted and solid line positions, and a pneumatic unit similar to pneumatic unit 28 may be used to vertically extend and retract finger unit 30 so as to perform the process of transferring fruit from conveyor 120 to the carton 124 on conveyor 122.

After seizing the fruit, fruit unit 30 is vertically retracted upwardly and the finger assembly 26 is pivoted from the dotted line position to the solid line position where the finger unit 30 is again vertically extended downwardly into a carton 124 where the fruit is released, after which the finger unit is vertically retracted upwardly and the operation is repeated.

FIG. 11 illustrates the manner of packing oranges in a carton 124, and shows particularly, that if an inflatable finger is forced into the corner of the carton, the corner will not be an obstruction, but instead the finger will assume the shape of the corner.

However, to insure insertion of finger unit 30 into carton 124 and prevent the fingers 32 adjacent the carton walls from engaging the walls so as to restrict insertion of the finger unit into the carton, the fingers 32 adjacent the carton walls may have a smaller diameter than the other fingers of the finger unit and may be arranged on the finger unit so as to be spaced from the carton walls. This arrangement of the fingers 32 adjacent the carton walls will also prevent the material forming the fingers from being ruptured or abraded when engaging the carton walls.

Also, an angle shield 125 mounted on finger base plate 34 and extending therefrom, may be empolyed in combination with fingers 32 which are adjacent the corners of the carton so as to assist in inserting finger unit 30 into carton 124. The shield will prevent the corresponding finfiers from engaging the carton and restricting the insertion of finger unit 30 therein. The shield 125 will also provide protection for those fingers adjacent the corners of the carton.

Other mechanical structures equivalent to that just described may be employed to accomplish substantially the same result.

Although the disclosed invention has been described with reference to handling fruit, it is to be understood that this was done for the purpose of orienting the apparatus and providing a point of reference. However, it is to be further understood that the apparatus is capable of handling articles other than fruit.

What is claimed is:

1. Fruit handling apparatus which comprises: an extendable and retractable finger unit which is adapted to transfer fruit from one location to another, said finger unit including a plurality of elongated inflatable fingers which when inflated compressively seize the fruit and when deflated release the fruit, said fingers each having axially spaced constrictions therein which divide each finger into sections; means for inflating said fingers when said finger unit is extended and for deflating said fingers when said finger unit is retracted; a pivotable pneumatic unit, said pneumatic unit embodying a cylinder and piston assembly which is connected to a source of air and which is also connected to and achieves extension and retraction of said finger unit; and another pneumatic cylinder and piston assembly which is also connected to a source of air and which is connected to and achieves pivoting of said pneumatic unit.

2. Fruit handling apparatus according to claim 1, whereing said finger unit includes an apertured tube for each inflatable finger and an air manifold connected to said means, each of said tubes being connected to said manifold from which air is delivered to said tubes to inflate the fingers and from which air is drained to deflate said fingers.

3. Apparatus adapted to grasp a plurality of discrete articles, such as fruit and the like, and comprising a finger support base; a plurality of elongated substantially rigid rods extended from said base and terminating in respective outer ends, the rods being arranged in spaced substantially parallel relationship to permit admission of such articles therebetween, each of said rods being provided with an axially extended fluid passageway and a plurality of axially spaced admission and exhaust ports in communication therewith; a plurality of tubular inflatable fingers individually mounted on said rods in overlying relation to said ports, each of said fingers having an open end secured to its respective rod in sealing relationship thereto and a closed end encasing the outer end thereof; restriction means carried by each of said rods and preventing radial expansion of the associated finger at selected axial locations; a source of pressure fluid; and means providing fluid communication between said source and the passageways of said rods, including control valve means to effect selective inflation and deflation of said fingers so that articles admitted between the fingers are grasped thereby upon inflation and released upon deflation.

4. In apparatus adapted to grasp a plurality of individual target objects, such as fruit growing on trees, and to effect a forcible transport thereof comprising a finger support base; mounting means for said support base including power means to effect reciprocal rectilinear movement of said base along a predetermined path of travel; a plurality of elongated substantially rigid rods extended from said base and terminating in respective outer ends, the rods being arranged in spaced substantially parallel relationship to permit admission of such articles therebetween, each of said rods being provided with a fluid passageway and a plurality of axially spaced admission and exhaust ports in communication therewith; a plurality of tubular inflatable fingers individual to the rods partially enclosing their respective rods in overlying relationship to said ports, each of said fingers having an open end secured to its respective rod in circumscribing sealing relationship thereto and a closed end encasing the outer end thereof; means individually circumscribing said rods and their respective fingers and preventing radial expansion of said fingers at selected axial locations along their fingers; a source of pressure fluid; means providing fluid communication between said source and the passageways of said rods, including control valve means to effect selective inflation and deflation of said fingers so that articles admitted between the fingers are grasped thereby upon inflation; and control means to effect selective operation of said power means so that articles grasped by said fingers are forcibly transported along said predetermined path of travel and released upon deflation of said fingers.

5. The apparatus according to claim 4 wherein said fingers are mounted on said support base for angular movement about their respective longitudinal axes, and wherein power means including control means therefor is carried by the base and connected to each of said fingers to effect selective angular movement thereof so that articles grasped between adjacent fingers are rotated and twisted to assist in their transport.

6. The apparatus according to claim 4 wherein each of said fingers is mounted on said support base within a tubular bushing permitting limited rectilinear movement of said finger in a direction substantially parallel to said path of travel, and wherein biasing means is provided in each of said bushings to urge the finger supported therein to an extended position so that limited retraction of each of said fingers is permitted upon striking an obstruction during reciprocal movement of said base along said predetermined path of travel.

7. Apparatus adapted to grasp a plurality of individual articles such as fruit or the like comprising a finger support base; a plurality of elongated rods extended from said base and terminating in respective outer ends, the rods being substantially longitudinally rigid and arranged in spaced parallel relationship to permit admission of articles therebetween, each of said rods being provided with an axially extended fluid passageway and a plurality of axially spaced admission and exhaust ports in communication therewith; a plurality of tubular inflatable fingers of an elastomeric material and respectively partially enclosing each of said rods in overlying relationship to said ports, each of said fingers having an open end and a closed end encasing the outer end of its respective rod; means securing the open end of each inflatable finger to its respective rod in circumscribing relation thereto at a location adjacent to said support base; a plurality of annular constricting collars axially spaced along each of said fingers intermediate axially adjacent ports, maintaining the finger in sealing relationship to its respective rod at said axial locations and preventing radial expansion at said locations thereby to divide each of said fingers into axially spaced sections; a source of fluid pressure; and means providing fluid communication between said source and the passageway of said rods including control valve means to effect selective inflation and deflation of said fingers so that fruit admitted between the fingers is grasped thereby upon inflation and released upon deflation.

8. In an article grasping apparatus having a plurality of elongated inflatable fingers, means individually supporting the fingers at one end thereof in substantially parallel adjacent spaced relation to receive articles to be grasped therebetween, and controlled means for concurrently corresponding inflating and deflating the fingers; elongated rigid elements individual to the fingers extended longitudinally to their respective fingers internally thereof and limiting transverse displacement of their respective fingers by reaction forces imposed transversely thereon as by expansion of the fingers against articles disposed therebetween, means borne by said finger supporting means individually rotatably mounting said elements and interconnecting said elements in substantially parallel spaced relation and in fixed longitudinal relation, and means spaced longitudinally of each element constricted about their element and respective finger securing said finger thereto and dividing the finger into correspondingly inflatable and deflatable sections.

9. In an article grasping apparatus having a plurality of elongated elastic inflatable fingers, means individually supporting the fingers at one end thereof in substantially parallel spaced relation for concurrent endward reciprocation between predetermined article grasping and article releasing positions, and means for inflating the fingers at the grasping position and deflating the fingers at the releasing position; elongated rigid means integral individual fingers and extended longitudinally of their respective fingers internally thereof and limiting transverse displacement of their fingers by reaction forces imposed transversely thereon as by expansion of the fingers against articles disposed therebetween, the axes of said rigid means being in fixed relation to the finger support means and to each other; and means permitting individual rotation of said rigid means and the fingers respectively enclosing said rigid means.

10. An article grasping apparatus comprising a plurality of elongated rigid tubular elements each having an open end and an opposite closed end, means connected to the open ends of the elements mounting said elements in fixed substantially parallel spaced relation and fixed longitudinal relation, elongated transversely expansible fingers mounted individually on said elements and having inflating chambers therein, means circumscribing the fingers and their respective elements at positions spaced longitudinally therealong and constricting the fingers against their elements dependably to position the fingers and to subdivide chambers into separate sections, the tubular elements being ported to the separate sections of the chambers of their respective fingers, and controlled pneumatic means connected to said elements for corresponding inflation and deflation of the separate sections of the fingers, the rigid elements defining article receiving spaced therebetween predetermined in maximum dimensions by the fixed spacing between the elements and the fingers expanding into said spaces upon inflation to grasp articles therein.

11. The fruit handling apparatus of claim 1 including means adapted to limit maximum finger inflation to an extent such that when all of the fingers are inflated to their maximum they are in spaced relation.

12. The apparatus of claim 3 including means limiting maximum finger inflation to an extent such that when the fingers are inflated to their maximum they remain in spaced relation.

13. An article grasping apparatus comprising a plurality of elongated rigid tubular elements each having an open end and an opposite closed end, means connected to the open ends of the elements mounting said elements in fixed substantially parallel spaced relation and fixed longitudinal relation, elongated transversely expansible fingers mounted individually on said elements, individual fingers having a plurality of successively adjacent inflating chambers longitudinally thereof, the tubular elements being ported to the chambers of their respective fingers, and controlled pneumatic means connected to said elements for corresponding inflation and deflation of the fingers, the rigid elements defining article receiving spaces therebetween predetermined in maximum dimensions by the fixed spacing between the elements and the fingers expanding into said spaces upon inflation to grasp articles therein.

14. The apparatus of claim 13 including means limiting maximum finger inflation to an extent such that when the fingers are inflated to their maximum they remain in spaced relation.

15. The apparatus of claim 13 in which the fingers are of laminated construction including a layer of elastomeric material and a layer of limited elasticity, the layer of limited elastic material limiting maximum finger inflation to an extent such that when the fingers are inflated to their maximum they remain in spaced relation.

16. The apparatus of claim 10 including means limiting maximum finger inflation to an extent such that when the fingers are inflated to their maximum they remain in spaced relation.

17. The apparatus of claim 10 in which the fingers are of laminated construction including a layer of elastomeric material and a layer of limited elasticity, the layer of limited elastic material limiting maximum finger inflation to an extent such that when the fingers are inflated to their maximum they remain in spaced relation.

18. An apparatus adapted to grasp a plurality of fruit and the like comprising a finger support base; a plurality of elongated rigid members; means individually mounting said members on the base for rotation in substantially parallel spaced relation to admit fruit therebetween; a plurality of tubular inflatable fingers individually mounted on said rigid members, said members having individual passages therethrough communicating with the interiors of their respective fingers; controlled pneumatic means connected to said passages adapted concurrently to expand the fingers to grasp fruit therebetween and concurrently to contract the fingers to release such fruit; and powered drive means connected to the rigid members adapted to rotate said rigid members and their fingers to rotate and to pick fruit disposed therebetween when the fingers are inflated.

19. The apparatus of claim 18 in which the rotating means is borne by the base and comprises levers individually connected to the rigid members and radially extended therefrom, push-pull link means pivotally interconnecting the extended ends of the levers, and controlled power means connected to the link means for actuation of the link means and levers to rotate the rigid members and fingers disposed thereon.

20. A grasping element for use in apparatus adapted to grasp a discrete article disposed between a plurality of such elements comprising an elongated substantially rigid tubular member having a closed end portion and an opposite mounting end portion, said element having a plurality of ports disposed in spaced relation longitudinally thereof with said member having impervious interstices therebetween and with the ports in common communication with the interior of said tubular member; a tubular elastic finger mounted in pneumatic tight relation on the tubular member in covering relation to said ports; and a plurality of bands spaced longitudinally of the member circumscribing the member and finger between the ports and constricting the finger into pneumatic tight engagement with said interstices to form a plurality of chambers within the finger externally of the member in common communication through the ports, said member being adapted at its mounting end portion for connection to a controlled source of gas under pressure whereby gas can be concurrently supplied under corresponding pressure to the chambers to inflate the finger between the bands and concurrently exhausted to contract the fingers.

References Cited

UNITED STATES PATENTS

| | | | |
|---|---|---|---|
| 2,609,113 | 9/1952 | Huffman | 214—651 |
| 2,611,612 | 9/1952 | Schmidt | 294—93 |
| 2,784,997 | 4/1957 | Baumann | 294—63 |
| 2,968,907 | 1/1961 | Bernheim et al. | 56—332 |
| 3,040,507 | 6/1962 | Lasswell | 56—328 |
| 3,077,720 | 2/1963 | Grove et al. | 56—328 |
| 3,118,555 | 1/1964 | Bent | 294—93 X |

GERALD M. FORLENZA, Primary Examiner.

RUSSEL R. KINSEY, ERNEST A. FALLER, SAMUEL F. COLEMAN, Examiners.

G. F. ABRAHAM, Assistant Examiner.